3,289,060
ELECTRICAL DEFLECTION OF RAINDROPS
Norman N. Rubin, Silver Spring, Md., assignor to the United States of America as represented by the Secretary of the Navy
Filed Nov. 27, 1963, Ser. No. 326,641
7 Claims. (Cl. 317—262)

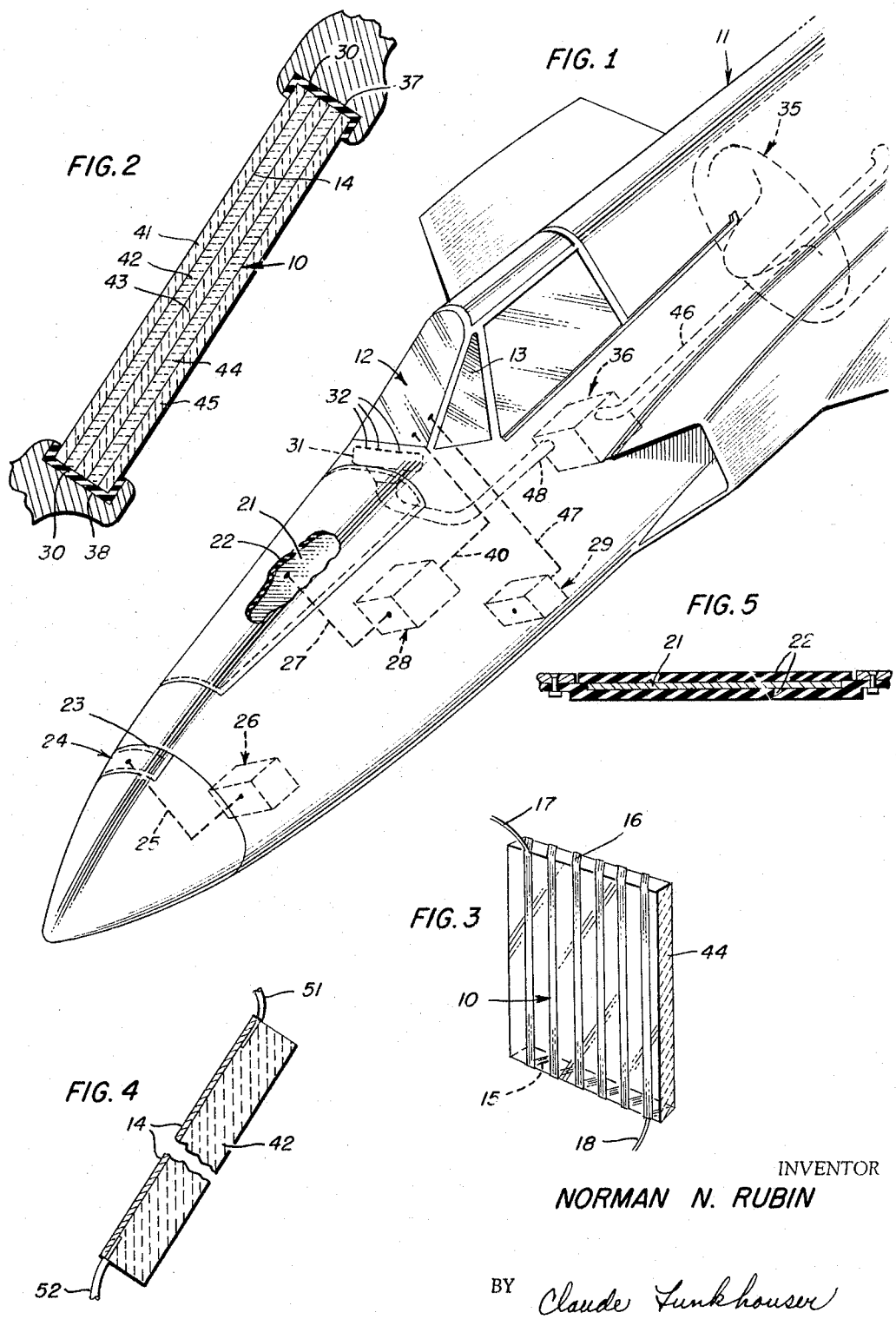

The invention described herein may be manufactured and used by or for the Government of the United States of America for governmental purposes without the payment of any royalties thereon or therefor.

This invention relates to windshield protectors and cleaners and more particularly provides a technique of windshield clearing for preventing rain impingement on windshields of high speed vehicles such as aircraft or space craft.

In order to premit safe operation of aircraft in inclement weather, it is essential that the pilot have good visibility. This requirement is especially important whenever a landing is attempted under instrument conditions or under marginal visual flight conditions which could occur in rain or thundershowers. With the advent of high speed, modern aircraft that have landing speeds in excess of 100 knots, mechanical wipers are inadequate since at these speeds the airstream can lift the wipers from contact with the windshield and the wiping action becomes ineffective.

In the past, attempts have been made to use a variety of techniques to keep windshields clear of moisture or ice. In some cases, aircraft designers have used a combination of two known techniques which aid each other in order to provide better windshield cleaning action. For example, some aircraft will use windshield wipers and a windshield coating material that reduces the molecular attraction between the windshield glass and any water present on the glass. The coating material causes the water to form into droplets thus allowing easy removal from the windshield by the airstream or by the wiping action of mechanical windshield wipers. A disadvantage of this sort of technique is the the effectiveness of the coating material may be reduced by being rubbed off by the wipers or being scoured off by the airstream. Also, coating materials may become opaque whenever foreign substances come in contact with them and thus further hinder rather than improve the windshield wiper's cleaning action. On lower speed aircraft this technique is sometimes feasible in spite of the disadvantage set out above, but on high speed vehicles the force of the raindrop striking the windshield usually causes the droplets to spread out on impact or to break into many minute droplets. This phenomenon lowers the pilot's visibility thereby negating any advantage gained by the use of coating materials.

Another prior art device which has met with some success in cleaning aircraft windshields has been the use of stationary or rotating air jets positioned in front and immediately below the windshield. High pressure air emulating from these jets form a curtain of air, parallel with the outside surface of the windshield, which prevents rain and other extraneous particles from impinging the windshield. This sort of technique is adequate in the speed ranges that present modern day passenger planes operate since a proper air velocity in the air curtain prevents particles impinging the windshiled. High speed military aircraft designers have found that this technique is not feasible since higher and higher air velocities are required from the air jets to provide an effective air curtain. Further, since the air for feeding these jets is obtained by bleeding engine air from compressor stages of the jet aircraft engines, only a predetermined amount of air is available in a specific aircraft. Also, air systems such as this can cause inefficient engine operation at low speeds and also the apparatus necessary for effective operation is heavy and bulky.

In accordance with the present invention, a technique is provided for maintaining a windshield of high speed aircraft clean in inclement weather conditions so that maximum visibility is accorded the pilot. The apparatus of the instant system may be used alone or incorporated with other windshield clearing techinques so that a maximum of windshield cleaning is obtained in the most efficient manner. The system uses the phenomenon of the electrostatic charges that are present in raindrops. Since the surface tension of raindrops is the result of intermolecular attractive forces which depend on the magnitude of the electrical charges within the molecule, control of the raindrops may be achieved by increasing their individual charges thereby increasing their individual surface tensions. To prevent raindrops from impinging an aircraft's windshield electrostatic and magnetic fields are positioned on the aircraft so that precharged raindrops are forced to travel along predetermined paths.

An object of the present invention is to provide a windshield clearing apparatus that has no moving parts.

Another object of the present invention is the provision of a windshield clearing apparatus that is suitable for air vehicles that operate at high speeds.

A further object of the present invention is the provision of a windshield protector and clearing apparatus that introduces minimum amounts of drag to the aircraft and is simple and efficient in operation.

Another object of the present invention is the provision of an improved windshield clearing apparatus that uses the charges present in raindrops to prevent impact of the rain on the windshield.

It is still another object of the present invention to provide a new and novel arrangement which will prevent raindrops from adhering to windshields thereby providing efficient clearing and de-icing for high speed air vehicles.

Another object of the present invention is the provision of a windshield clearing apparatus which is simple and foolproof in operation.

Another object of the present invention is to provide an aircraft windshield clearing apparatus which can be used to supplement existing clearing techniques.

It is still a further object of the present invention to provide a method of utilizing the electrostatic charges carried by raindrops to prevent accumulation of droplets of rain on a surface.

Other objects, advantages and novel features of the invention will become apparent from the following detained description of the invention when considered in conjunction with the accompanying drawings wherein:

FIG. 1 is a perspective view of the windshield clearing apparatus of this invention installed on a jet aircraft.

FIG. 2 is a cross-sectional view of the windshield of the aircraft.

FIG. 3 is a perspective view of a laminated plate of the windshield which provides the magnetic field.

FIG. 4 is a cross-sectional view of a laminated plate section of the windshield which provides the static field.

FIG. 5 is a cross-sectional view of the construction of the static plate.

Referring particularly to FIG. 1 of the drawings, there is shown an embodiment of the invention adapted for use with high speed vehicles such as jet powered aircraft 11. This aircraft 11, as shown, has a front windshield 12 and two side panel windshields (one shown as 13 and the other not shown). It is essential that the front windshield 12 be kept clear of rain, snow and ice accumulations at all times in order for the pilot to have maximum visibility for safe operation of the aircraft. This is especially necessary whenever landings are being attempted under inclement weather conditions.

The windshield, best shown in FIG. 2, is of the laminated type construction and is rigidly attached to the cabin of the aircraft 11 at 37 and 38 by fastening means known to those skilled in the art. All of the plates 41, 42, 43, 44 and 45 forming windshield 12 may be transparent plastic, glass or any other suitable material. Plate 42 which is sandwiched between plates 41 and 43 has a metallized coating 14 on one of its surfaces. This metallized coating is usually in the form of a thin transparent film of metal which is conductive but optically clear. The metallic coating is applied on the surface of plate 42 in a manner familiar to those skilled in the art. The plates 43 and 45, as shown in FIG. 2, have a plate 44 sandwiched between them. The construction of plate 44 is best shown in FIG. 3. A number of fine wires 10 are placed on either side of the plate 44 by suitable means such as vacuum deposition. A coil is formed by connection of wires 10 over the edges of plate 44 at loops 15 and 16. This construction forms a continuous coil which is electrically conductive. Sheet 44 is suitably insulated by insulation 30 to prevent short circuiting of the loops 15 and 16 to the metal cabin structure. Fine wire leads 17 and 18 are fastened to the outer loops of coil 10 to cabling 47 to provide a means for electrically coupling current through the coil 10, from electrical apparatus 29. The windshield 12 may also be constructed as a bulletproof shield for the pilot by techniques known to those in the laminated glass arts.

With reference again to FIG. 1, there is shown a static plate 21 which may be positioned on the outer skin of the jet aircraft 11. Static plate 21 may be formed of two insulating layers 22 which has positioned therebetween a metallic plate 21. Metallic plate 21 may be vacuum deposited on either of the inner surfaces of the insulating layers 22 in order to obtain a light and relatively strong structure. Static plate 21 is insulated from the skin of jet aircraft 11 (best shown in FIG. 5) by allowing a strip of insulating material of suitable dimension to extend from the perimeter of the metallic sheet 21. This structure may be fastened to the skin of aircraft 11 by any suitable means. The static plate 21 is electrically connected, by appropriate electrical cable 27, to electrical apparatus 28 which provides plate 21 with an electrostatic charge of positive or negative polarity. Electrical leads 40 also are connected from the electrical apparatus 28 to electrically conductive surface 14 of sheet 42. Appropriate electrical leads 51 and 52, respectively, as shown in FIG. 4, are attached to either side of sheet 42 in order to provide electrical coupling means for applying the desired electrostatic charge to plate 14.

A flush mounted antenna 24 is positioned on the nose of aircraft 11 in front of static sheet 21. This antenna 24 is also insulated from the skin of aircraft 11 at 23 and is fastened to the skin in a manner known to those skilled in the art. Positioned inside the aircraft is a transmitter 26 which is electrically coupled by appropriate cabling 25 to antenna 24.

Immediately in front and below the windshield 12, as shown in FIG. 1, is an air dispersion apparatus 31. Apparatus 31 positioned inside the aircraft is flush mounted at the base of windshield 12. Jet nozzles 32 are operatively coupled to dispersion apparatus 31 and these nozzles 32 extend through the aircraft's skin to the base of the outer surface of the windshield. Jet engine 35 has an air duct 46 connected to a controlling apparatus 36 to control the amount of air tapped from a compressor stage of engine 35. Another air duct 48 supplies air to the air dispersion apparatus 31. Controlling apparatus 36 is any known air controlling means which can be remotely operated by the pilot.

In operation in order to effect windshield clearing and rain removal functions by the apparatus just described, transmitter 26 positioned in the nose of the aircraft 11 operates to produce fixed radio frequency energy in the vicinity of the aircraft's nose. The radio frequency energy is conducted over cable 25 from transmitter 26 to a flush mounted antenna 24 positioned on the nose of aircraft 11. Antenna 24 is of such construction that it radiates a pattern of radio frequency energy only in an upward direction. This antenna 24 provides an extremely intense energy field in front of windshield 12. As particles of rain or other extraneous matter pass through the energy field produced by antenna 24, they become charged. In the case of rain droplets, the action of the energy will cause an increase in the charge present in the raindrops.

As the charged raindrops move towards the aircraft windshield, they travel in a path that lies over a charged static plate 21. Electrical apparatus 28 supplies the necessary high voltage, via leads 27 to plate 21, for maintaining a charge of a particular polarity on plate 21. Charged raindrops of opposite polarity than the plate are attracted to the charged plate 21, thus preventing these raindrops from reaching the aircraft's windshield. Other particles and raindrops which may have the same charge at plate 21 will be repelled by plate 21 and proceed on toward the windshield. The windshield is of such a construction that a charge of the same polarity of that existing on plate 21 is maintained on static plate 14. The electrical apparatus 28 in addition to providing the electrostatic charge for plate 21 also provides an electrostatic charge of the same polarity for the static plate 14 which is part of the laminated windshield 12. Charged rain droplets with opposite charges which are not attracted to static plate 21 will be repelled by the charge on windshield static plate 14, therefore, causing the charged rain droplets to pass either over or around either side of windshield 12.

Windshield 12 is also equipped with a magnetic deflection member 44. This member provides a magnetic field around the aircraft windshield whenever current is passed through the winding 10. An electrical apparatus 29 positioned inside the aircraft supplies the necessary current to winding 10 via cable 47. Winding 10 is wound so as to be equivalent to a field winding of a direct current electric motor. As the charged raindroplets approach the field generated by winding 10, the raindroplets will divert either to the right or the left of the windshield. This action is caused by the magnetic field acting on the charged rain droplets. The amount of force given the charged rain droplets will depend on the magnetic field generated about coil 10 and the polarity and magnitude of the charged raindrop approaching the windshield.

The moisture removal apparatus 31 aids in the above electrostatic and magnetic deflection of the raindrops. Apparatus 31 supplies a curtain of high speed air in front of and parallel to the front surface of the aircraft windshield 12. This apparatus operates to prevent rain or other particles from penetrating a high velocity curtain of air maintained in front of the windshield by the jets 32. It is possible for the pilot to regulate the volume and velocity air curtain by control 36. In this way, the amount of air being bled from the compressor stage of jet engine 35 may be controlled so that the pilot can effect the most efficient moisture removal from the windshield without impairing the efficiency of operation of the jet aircraft engine.

It is apparent from the foregoing that the invention described and shown above provides an apparatus that efficiently and effectively furnishes a technique which prevents moisture particles or other extraneous particles from impinging the surface of a windshield of a high speed vehicle, yet is of such a construction that it does not have any significantly detrimental aerodynamic effects upon the aircraft upon which it is installed. The provisions of this invention are equally applicable with other known windshield clearing or moisture removal means, so that one apparatus is capable of supplementing another in order to provide the most efficient rain removal system possible for high speed vehicles.

Obviously many modifications and variations of the present invention are possible in the light of the above teachings. It is therefore to be understood that within the scope of the appended claims the invention may be practiced otherwise than as specifically described.

What is claimed is:

1. A windshield clearing apparatus for windshields of high speed vehicles which provides increased pilot visibility under adverse climatic flying conditions comprising:
    charging means for increasing charges in individual particles passing thereover;
    attracting means, positioned behind said charging means in the path of the particles for attracting the charged particles; and
    repelling means positioned behind said attracting means;
    whereby the particles are charged by passage over the charging means to provide increased force of attraction by the attracting means and increased force of repulsion by the repelling means.

2. A windshield clearing apparatus for windshields of high speed vehicles which does not disturb the aerodynamic characteristics of the vehicle and which provides efficient windshield clearing thereby increasing pilot visibility under adverse meterologic flying conditions comprising:
    charging means positioned substantially in front of said high speed vehicle's windshield for providing a high frequency energy field through which raindrops must pass before they impinge the front surface of said high speed vehicle's windshield;
    first static plate means positioned between said raindrop charging means and said high speed vehicle's windshield having an attractive charge for pulling charged raindrops to its surface; and
    second static means positioned in said high speed vehicle's windshield having a repelling charge for providing a force to prevent charged raindrops from striking the surface of said high speed vehicle's windshield;
    whereby the electrostatic charge of the raindrops is increased by the charging means for providing increased attractive force to the first static plate means and increased repelling force by the second static plate means thereby preventing any of the charged raindrops to impinge the surface of the high speed vehicle's windshield.

3. A windshield clearing apparatus for windshields of high speed vehicles which uses an air blast rain deflection system comprising, in combination:
    antenna means positioned substantially in front of said windshield;
    said antenna means electrically charging raindrops passing thereover by radiating an extremely high energy field;
    first static plate means positioned in the path of raindrops travel for providing attraction of raindrops;
    said first static plate charged with a polarized electrical potential for providing an attractive force to raindrops polarized to a different polarity;
    second static plate means positioned in the vicinity of the windshield for providing repelling force to the raindrops not attracted to the said first static plate means; and
    magnetic deflection means positioned in said windshield for providing magnetic fields for repelling raindrops to either side of the center of the windshield;
    said magnetic deflection means having electrical conductive convolutions for providing electrical current flow therethrough.

4. A method of preventing rain from impinging a windshield which comprises the steps of:
    charging rain droplets with increased electrostatic charges;
    attracting the charged raindrops of unlike charge to a charged plate positioned before the windshield;
    repelling like charged raindrops electrostatically from a charged plate positioned in the vicinity of the windshield; and
    repelling charged rain droplets to either side of the windshield by magnetic deflection means.

5. A windshield clearing technique for use on high speed vehicles which comprises the steps of:
    charging individual raindrops as they pass over the nose section of a high speed vehicle;
    attracting the charged raindrops of unlike charge to an electrostatic plate positioned immediately in front of the windshield; and
    repelling charged raindrops of like charge by an electrostatic plate positioned in the windshield;
    whereby raindrops are prevented from impinging the surface of the windshield thereby providing maximum pilot visibility.

6. In an aircraft windshield clearing apparatus for high speed vehicles which provides efficient windshield clearing thereby increasing pilot visibility under adverse climatic flying conditions comprising, in combination:
    a laminated aircraft windshield;
    said windshield having first, second, third, fourth and fifth laminate plates;
    said second laminate plate sandwiched between said first and third laminate plates;
    said second plate having an optically clear metallic coating on its surface;
    means to supply polarized potential to the metallic coating;
    said metallic coating electrically conductive for providing an electrostatic polarized charge about said windshield to provide repelling force to raindrops immediately before said windshield;
    said fourth laminate plate sandwiched between said third and fifth laminate plates;
    said fourth laminate plate having electrically conductive convolutions thereabout for providing a coil;
    means for providing electrical current through convolutions;
    said fourth laminate plate providing electromagnetic deflection means for forcing any raindrops in front of said windshield to either side of the center of said windshield;
    whereby raindrops moving toward the windshield are prevented from impinging the front surface of said windshield.

7. In a windshield clearing apparatus for high speed vehicles which is totally electrical comprising the combination:
    charging means positioned in front of said vehicle's windshield for providing a high energy field in the path of raindrops in the vicinity of the windshield; and
    electromagnetic deflection means positioned about the windshield for repelling raindrops approaching the surface of the windshield from said charging means; whereby the raindrops are provided with an increased potential by the charging means and forced either to one side or the other side of center of the windshield by the electromagnetic deflection means thereby preventing impingement of raindrops upon the surface of the windshield.

References Cited by the Examiner

UNITED STATES PATENTS 2,347,114 4/1944 Larson _____ 317—262 X
3,011,435 12/1961 Jones et al.

MILTON O. HIRSHFIELD, *Primary Examiner.*

L. T. HIX, *Assistant Examiner.*